Feb. 6, 1968 K. W. SELF ET AL 3,367,458
BACK-OUT BRAKE
Filed Oct. 22, 1965 3 Sheets-Sheet 1
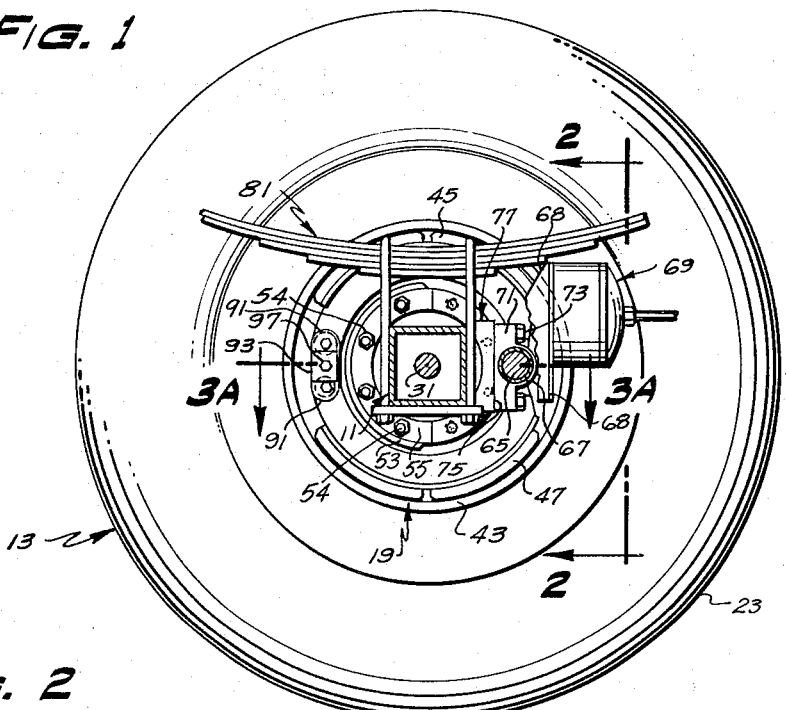
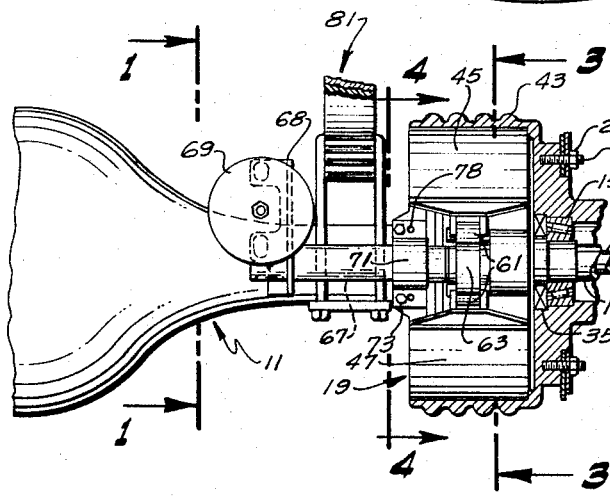
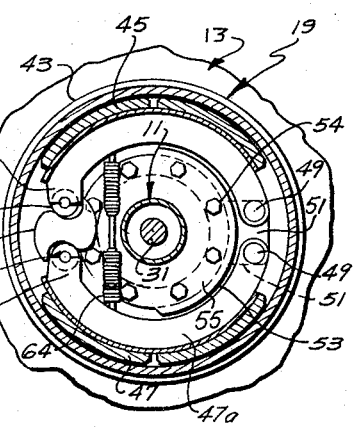
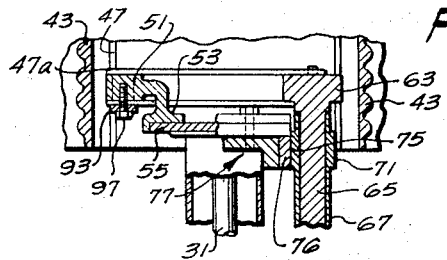
KENNETH W. SELF
GEORGE W. BROWN
INVENTOR
BY
BUCKHORN, BLORE, KLARQUIST & SPARKMAN
ATTORNEYS

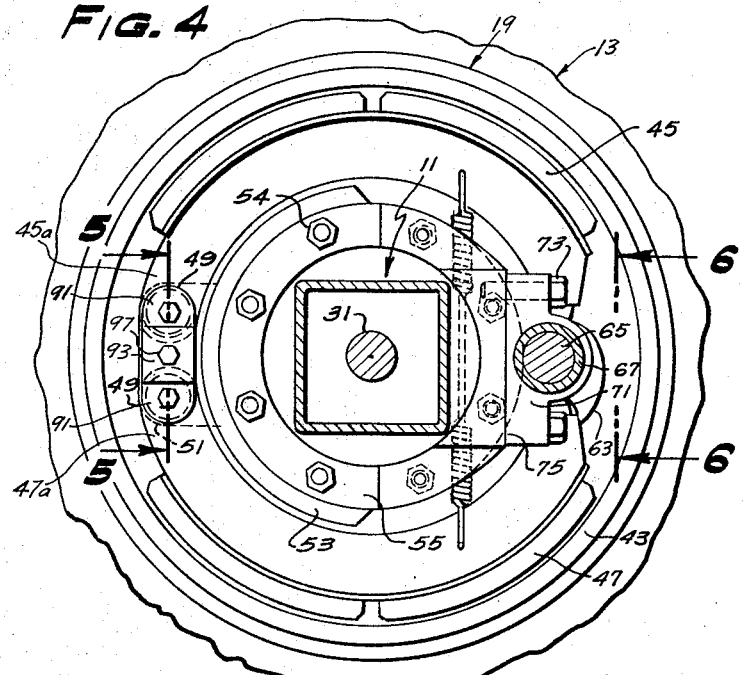
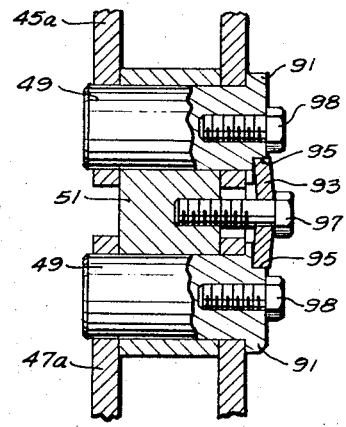
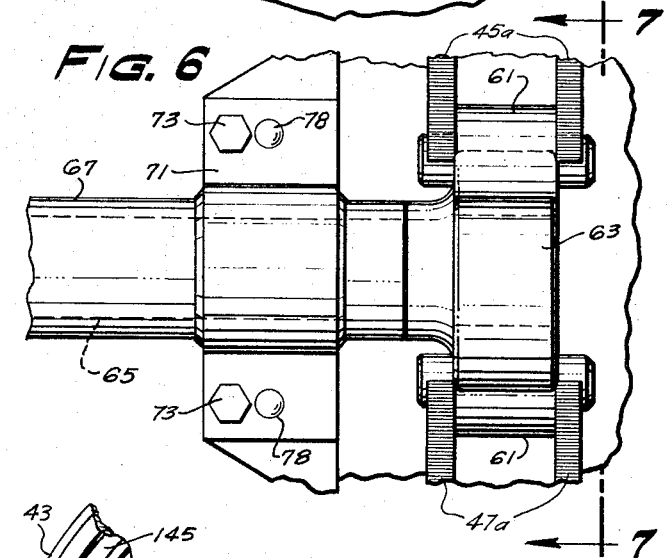
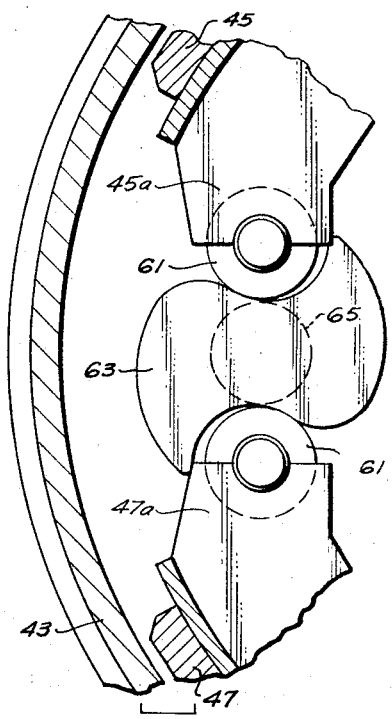
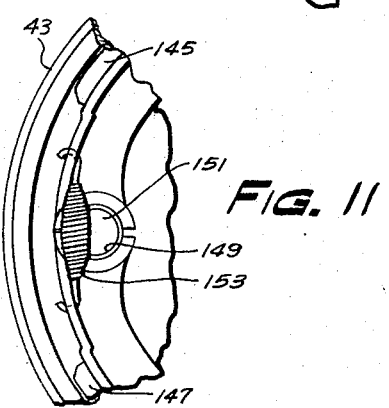
KENNETH W. SELF
GEORGE W. BROWN
INVENTOR
BY BUCKHORN, BLORE, KLARQUIST & SPARKMAN
ATTORNEYS Feb. 6, 1968  K. W. SELF ET AL  3,367,458
BACK-OUT BRAKE
Filed Oct. 22, 1965  3 Sheets-Sheet 3
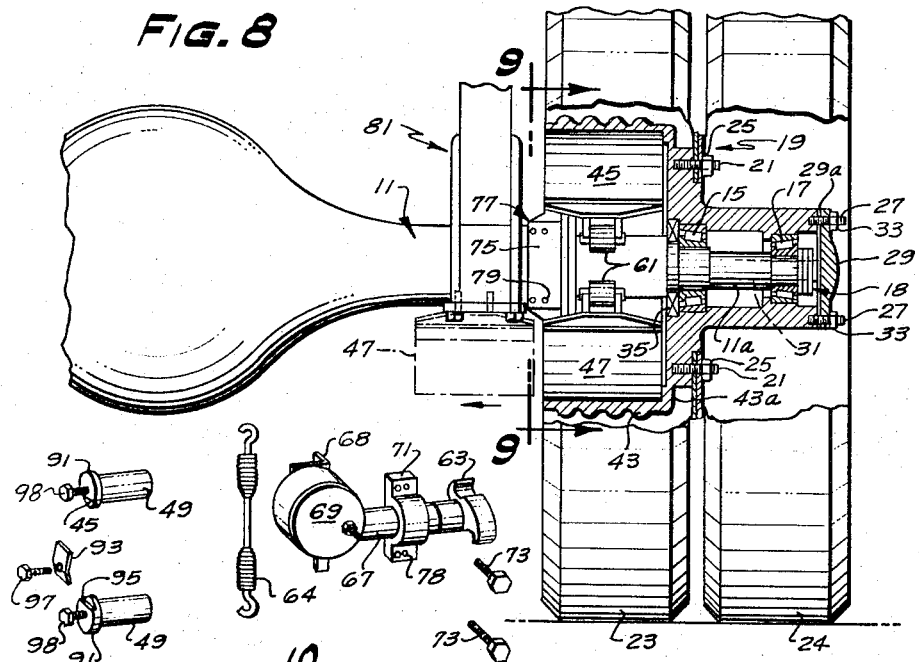
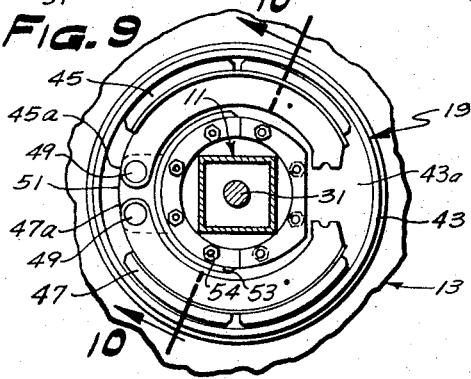
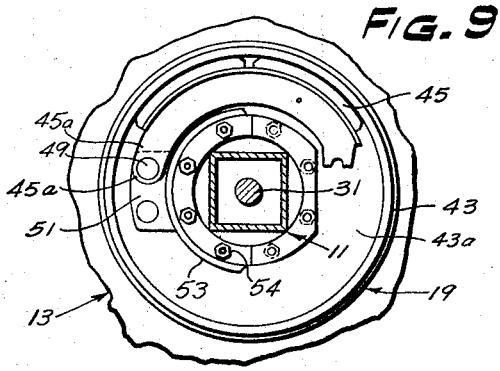
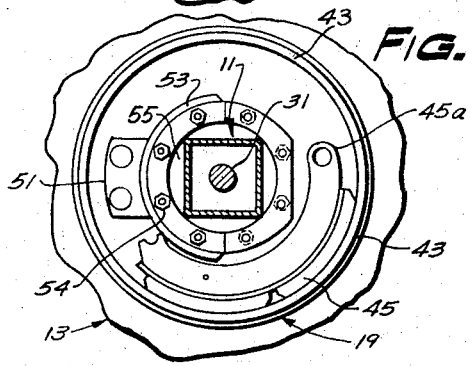
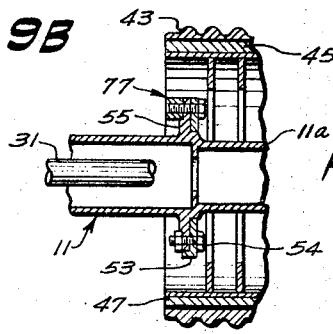
KENNETH W. SELF
GEORGE W. BROWN
INVENTOR
BY
BUCKHORN, BLORE, KLARQUIST & SPARKMAN
ATTORNEYS United States Patent Office 3,367,458
Patented Feb. 6, 1968

3,367,458
BACK-OUT BRAKE
Kenneth W. Self and George W. Brown, Portland, Oreg., assignors to Freightiner Corporation, Portland, Oreg., a corporation of Delaware
Filed Oct. 22, 1965, Ser. No. 500,622
3 Claims. (Cl. 188—206)

ABSTRACT OF THE DISCLOSURE

Brake structure for a wheeled vehicle including a pair of curved brake shoes mounted at one set of ends by pivot pins secured to a brake spider, a brake actuator disposed at the opposite ends of the brake shoes, a bracket rotatably supporting the brake actuator and secured to the spider. The actuator is releasably attached to the spider such that the brake actuator may be removed from the brake drum to permit removal of the brake shoes without jacking the vehicle axle or removing the vehicle wheel and its associated bearings.

---

This invention relates to the brake structure of a wheeled vehicle, and particularly relates to a brake structure of the type having a pair of curved brake shoes expandable into engagement with a brake drum to attain braking action. While the invention will be explained in connection with the brake structure for the traction wheels of the tractor of a tractor-trailer rig, the invention has application to the other wheels of the tractor, to the wheels of the trailer and also to other wheeled vehicles.

At the present time, when it is desired to replace the brake shoes of the wheel assembly of the tractor or trailer of a tractor-trailer rig, the wheel is jacked up, the wheel and brake drum removed to break the oil seal, whereafter the bearings are pulled off and then the shoes are detached and removed. This is not only a time-consuming and thus expensive job, but there is danger of contaminating the bearings with grit or dirt which would sharply limit their useful life, and a further possibility of improper reinstallation of a new oil seal.

It is a main object of the present invention to provide a brake structure designed so that the brake shoes can be replaced without removal of the wheel and its bearings.

It is a more specific object to provide a wheel structure wherein the shoe actuating structure is so designed and mounted that it may be detached and removed from the associated axle member, while the wheel remains in place, whereby to provide access to the associated brake shoes and to facilitate backing out and thus removal of the same in an inward direction, with the associated wheel remaining in running condition mounted on its axle member.

Various other objects of the invention will be apparent from the following description taken in connection with the accompanying drawings wherein:

FIG. 1 is a vertical sectional view of a wheel having the inventive back-out brake mechanism, the view being taken toward the inside face of the wheel in the direction of the section line 1—1 of FIG. 2, certain parts being broken away for convenience in illustration;

FIG. 2 is an elevational view taken generally in the direction of arrows 2—2 of FIG. 1, but showing the brake drum broken back to the vertical midsectional plane to better show the relationship of the brake shoes and the brake shoe actuating mechanism;

FIG. 3 is a vertical sectional view of the brake structure taken generally along line 3—3 of FIG. 2;

FIG. 3A is a horizontal sectional view taken along line 3A—3A of FIG. 1;

FIG. 4 is a vertical sectional view of the brake structure taken along line 4—4 of FIG. 2, on a scale greater than employed in FIG. 1;

FIG. 5 is a vertical sectional view taken along line 5—5 of FIG. 4, showing the brake shoe retaining mechanism on a scale larger than that depicted in FIG. 4;

FIG. 6 is an elevational view taken in the direction of the arrows 6—6 in FIG. 4 but on a larger scale and showing a close up view of the mounting arrangement for the bracket of the brake shoe actuating mechanism;

FIG. 7 is a vertical sectional view taken along line 7—7 of FIG. 6, better showing the relationship of the cam to the cam follower rollers on the shoes;

FIG. 8 is a view similar to FIG. 2, but showing the brake shoe pivot pins and actuating mechanism removed leaving the brake shoes in place;

FIG. 9 is a vertical sectional view taken along line 9—9 of FIG. 8, but showing the follower rollers removed;

FIG. 9A is a view similar to FIG. 9, showing the lower shoe as having been removed;

FIG. 9B is a view similar to FIG. 9A, but showing the upper shoe as having been shoved around to a position for axial withdrawal; and FIG. 10 is a sectional view taken along lines 10—10 of FIG. 9 showing the axle housing flange and the spider therefor;

FIG. 11 is a fragmentary view in elevation showing another form of conventional brake shoe pivotal mount.

Referring to FIGS. 1, 2 and 8, the general arrangement shown (apart from inventive structure to be discussed) is a conventional dual rear truck wheel structure including a rear axle housing 11 having a wheel unit 13 mounted thereon by bearings 15 and 17 and detachably retained in place by a nut assembly 18. The wheel unit includes a brake drum unit 19 having studs 21 to mount the dual wheels 23 and 24 by nuts 25. The drum unit also has studs 27 to receive the drive flange 29 (and its gasket 29a) of an axle shaft 31 which extends through the leg 11a of the housing and projects therefrom. The drive flange is secured on the studs 27 by nuts 33. An oil seal 35 is arranged between the bearings 15 and 17 and the brake shoe chamber of drum unit 19.

The brake drum unit includes a brake drum 43 which is essentially closed at its outer end by the annular portion 43a of the drum unit. The drum 43 surrounds a pair of curved brake shoes 45 and 47 which are mounted at one set of ends by pivot pins 49 on a luge 51 of a spider 53. The spider is secured by bolts 54 to an annular flange 55 (FIG. 10) which is a permanent part of the outboard end portion of the axle housing leg 11a.

The other set of ends of the brake shoes have sockets receiving the stub ends of a pair of cam follower rollers 61 (FIGS. 2 and 3) which are disposed on opposite sides of an S cam 63 and held against such cam by a tension spring 64, shown in FIG. 3. The S cam is an integral part of, or fixedly and permanently secured to a shaft 65 (compare FIGS. 3, 6 and 7), the latter extending through and being rotatably supported by a tubular portion 67 of a support bracket 68. The bracket 68 has an air cylinder unit 69 mounted on its inboard end, the cylinder actuating (turning) the shaft 65 and thus the S cam 63 by a mechanism not shown, but which is conventional. In fact, all the above structure per se (apart from certain features to be presently explained) is present in a current version of a Timken truck axle assembly. In such current version, however, the bracket has a radial flange on the outer end of the tubular portion 67 and this flange is bolted in an axial direction to the inner face of a second radial lug on the spider, and the cam shaft extends through a hole in this second lug. The only way to dismount the bracket in such Timken assembly is to remove the S cam and its shaft by movement in an outward direction and the bracket in an inward direction. While the spider can be removed, this could only be done in an outward direction, it being mounted on the outer face of the axle housing flange. Thus it is impossible to remove the brake shoes from the inside of the wheel of this Timken assembly because the spider would get in the way.

In the present invention, the bracket 68 has a mounting portion 71 (FIGS. 1 and 2) permanently secured thereto, the latter being detachably secured by horizontal bolts 73 to a vertical flat 75 (FIG. 1) machined on an offset boss 76 of an arcuate adaptor piece 77. The bracket has dowel pins 78 fitting in dowel holes 79 in the flat 75 to properly locate the bracket on the adaptor piece. The adaptor piece is secured by certain of the previously mentioned bolts 54 (FIG. 10) to the inner face of the flange 55 of the axle housing 11. It is evident from FIG. 2 that the bolts 73 are disposed inwardly of the inner edge of the brake drum and thus are readily accessible at the inner face of the dual wheel at a place outwardly of the leaf spring unit 81, but inwardly of the brake drum. The leaf spring unit is mounted in conventional fashion on the axle housing 11.

FIGS. 1, 4 and 5 best show the manner of mounting the pivot pins 49 in place, the pins being mounted in a special manner so that they can be readily removed by operations conducted from the inner face of the dual wheel. The lug 51 is provided with a pair of bores to receive the pins 49, the pins also passing through matching holes in end clevis portions 45a and 47a of the shoes 45 and 47, respectively. The pins are inserted through the clevis portions and through the lug 51 in an outwardly direction, the pins being provided with heads 91 to abut against the clevis portions. A bent, plate-like retainer 93 fits in recesses 95 formed in the opposed margins of the heads 91 of the pins 49 and a screw 97 secures the retainer 93 to the spider lug 51 and therefore retains the pins 49 in place. The pins are provided with axial bolts 98 which can be backed off or removed (for replacement by a removal tool) to facilitate withdrawal of said pins.

*Brake shoe removal operation*

It is pointed out that no dust cover or shield is provided at the inner open end of the brake drum, but one may be provided if desired. If one is provided, it will probably be of split construction and the first step in removing the brake shoes would be to remove the dust cover. Thereafter, the actuating mechanism for the brake shoes (which includes the S cam 63, its shaft 65, the bracket 68, and the air cylinder unit 69) is removed by removing the screws 73 (compare FIGS. 1, 2 and 8) to separate the shoe actuating mechanism from the remainder of the wheel structure. Either before or after removal of the brake shoe actuating mechanism, the pins 49 are removed by removing the bolt 97 and the retaining piece 93. At this time, the parts will be generally as shown in FIG. 8, with the removed parts shown separated from the remainder of the wheel structure. The cam follower rollers 61 in FIG. 8 are detachably retained in place by clip springs (not shown) of conventional design.

Next, these cam rollers 61 and the spring 64 are removed. Thereafter, the lower shoe 47 is removed by shoving it around counterclockwiese until its clevis portions 47a clear the lug 51, and then sliding it inwardly beneath the leaf spring unit 81 to the dotted line position shown in FIG. 8. Thereafter, the upper shoe 45 is shoved around clockwise (FIG. 9) inside the brake drum until it assumes a lower position within the drum as shown in FIG. 9B, whereafter it can be slid inwardly free of the brake drum. The reason the upper shoe 45 has to be shoved around to a lower position to be removed is that the leaf spring assembly 81 is in the way of direct inward removal of upper shoe 45 in its upper position, as is evident from FIGS. 2 and 8. Now new shoes can be installed, employing a reverse procedure from that just described, the original follower rollers being mounted on the new shoes prior to installing the latter.

While the invention has been described in connection with a full floating live axle construction, it is obviously applicable to the other axle constructions of a truck, whether they be dual wheels or single wheels. In a dead axle construction, the present brake structure would remain unchanged. In case of a steerable wheel having brakes (many do not), the shoes would be pivoted on the hub spindle which would also rotatably mount the brake drum.

For convenience, the term "axle member" will be used to indicate either a dead axle or an axle housing or a hub spindle. It is also evident that the present invention can be incorporated in the brake structures of other wheeled vehicles.

With the brake structure disclosed in the present invention, the time for changing the brake shoes is materially reduced. In a time comparison, it has been found that brake shoes can be removed and replaced in a fraction of the time previously required. In one test, shoes on an inventive structure were removed and replaced in fifteen minutes, whereas the time required in a conventionl structure where the wheel must be removed along with the wheel bearings and care be taken not to contaminate the bearings, the time was double or triple, or more of that mentioned above. In addition to the saving in time, there is no necessity of breaking the oil seal and no necessity for exposing the wheel bearings to contamination with dirt, grit and the like.

Our brake arrangement can readily be incorporated in other axles, for instance, the Eaton axle which is very similar to the basic Timken axle arrangement shown in the present drawings, except that the ends of the brake shoes 145 and 147 (FIG. 11), instead of being mounted by pivot pins on the lug 51, have end sockets 149 bearing against a fixed stud 151 on a spider, and are held against the stud by one or more tension springs 153. By a long thin tool, the outboard spring can be removed, the inboard spring requiring no such tool since it is directly accessible.

While the above mentioned Eaton and Timken brakes have pivoted shoes, the Rockwell Stop Master brake, such as shown on pages 292 and 293 of Motor's Truck Repair Manual, 18th edition, has an arrangement whereby when the brake is applied, pressure (air or hydraulic) forces a pair of wedges between pairs of plungers to spread apart and push the brake shoes against the brake drum. The concepts of the present invention can be applied to brake shoes that are mounted not only by being pivoted at one set of ends but also where both sets of ends are actuated.

Having described the invention in what is considered to be the preferred embodiment thereof, it is desired that it be understood that the invention is not to be limited other than by the provisions of the following claims.

We claim:
1. In combination:
   an axle housing having an outwardly extending hollow leg having near its outer end an annular flange permanently secured in place,
   an axle shaft extending through said hollow leg and having a portion projecting therefrom,
   a brake drum unit operatively connected to said axle shaft portion and rotatably mounted by antifriction bearings on said axle housing in surrounding relation to said annular flange,
   said brake drum having a brake shoe chamber opening in an inward direction,
   oil seal means around said axle housing and operatively disposed between said bearings and the brake shoe chamber,
   a pair of arcuate brake shoes within the brake shoe chamber of said drum, a spider member secured to the outer face of said axle housing flange,
said brake shoes having one set of ends pivotally mounted on said spider,
an adaptor piece secured to the inner face of said axle housing flange,
said adaptor piece having a vertical face parallel to the plane of the axis of said axle shaft and provided with threaded holes normal to said face,
a bracket secured to said vertical face by bolts fitting in said threaded holes,
a cam shaft extending through a horizontal bore in said bracket and having an integral S cam on the outer end thereof engaging follower rollers on the other set of ends of said brake shoes,
spring means urging said follower rollers against said S cam,
power means mounted on said bracket in inboard relation to said S cam and operatively connected to said camshaft,
the aforementioned threaded holes of said adaptor piece being located inwardly of the inner edges of said brake shoes to be readily accessible at the inner end of said brake drum facilitating ready removal of said bolts and thus said bracket and associated parts, and thus facilitating removal of said shoes in an inward direction without disturbing said drum, its bearings or said oil seal.

2. In combination:
an axle housing having an outwardly extending hollow leg having near its outer end an annular flange permanently secured in place,
an axle shaft extending through said hollow leg and having a portion projecting therefrom,
a brake drum unit operatively connected to said axle shaft portion and rotatably mounted by antifriction bearings on said axle housing in surrounding relation to said annular flange,
said brake drum having a brake shoe chamber opening in an inward direction,
oil seal means around said axle housing and operatively disposed between said bearings and the brake shoe chamber,
a pair of arcuate brake shoes within the brake shoe chamber of said drum,
said brake shoes having one set of ends pivotally mounted on said annular flange of said axle housing,
an adaptor piece secured to the inner face of said axle housing flange,
said adaptor piece having a vertical face parallel to the plane of the axis of said axle shaft and provided with threaded holes normal to said face,
a bracket secured to said vertical face by bolts fitting in said threaded holes,
a cam shaft extending through a horizontal bore in said bracket and having an integral S cam on the outer end thereof engaging follower rollers on the other set of ends of said brake shoes,
spring means urging said follower rollers against said S cam,
power means mounted on said bracket in inboard relation to said S cam and operatively connected to said camshaft,
the aforementioned threaded holes of said adaptor piece being located inwardly of the inner edges of said brake shoes to be readily accessible at the inner end of said brake drum facilitating ready removal of said bolts and thus said bracket and associated parts, and thus facilitating removal of said shoes in an inward direction without disturbing said drum, its bearings or said oil seal.

3. A vehicle brake system comprising:
a non-rotatable axle housing;
a U-shaped brake drum rotatably mounted on the axle housing;
a brake shoe carrier mounted on the axle housing non-rotatably supporting a pair of arcuate, removable brake shoes within the drum for movement into and out of engagement with the drum and defining an opening in the open end of the drum, said opening being larger than an area of one of the brake shoes; and
actuating means removably secured to the brake shoe carrier and operatively associated with the brake shoes for moving the shoes into engagement with the drum;
whereby said brake shoes may be removed from said carrier without removing the drum from the axle housing.

References Cited
UNITED STATES PATENTS

| | | |
|---|---|---|
| 1,682,783 | 9/1928 | Gunn. |
| 3,144,100 | 8/1964 | Kay _____ 188—206 X |
| 3,269,494 | 8/1966 | Tantlinger et al. _____ 188—206 |

DUANE A. REGER, *Primary Examiner.*